United States Patent
Ohnuki et al.

(10) Patent No.: US 11,958,074 B2
(45) Date of Patent: *Apr. 16, 2024

(54) METHOD FOR FORMING A MULTILAYER COATING FILM

(71) Applicants: KANSAI PAINT CO., LTD., Amagasaki (JP); NISSAN MOTOR CO., LTD., Yokohama (JP)

(72) Inventors: Tatsuo Ohnuki, Hiratsuka (JP); Kenichi Umezawa, Hiratsuka (JP); Junpei Suzuki, Hiratsuka (JP); Tomoyuki Okamoto, Atsugi (JP); Chie Michiura, Atsugi (JP); Takamitsu Ono, Atsugi (JP); Yoshiaki Tomiyama, Atsugi (JP)

(73) Assignees: KANSAI PAINT CO., LTD, Amagasaki (JP); NISSAN MOTOR CO., LTD., Yokohama (JP)

( * ) Notice: Subject to any disclaimer, the term of this patent is extended or adjusted under 35 U.S.C. 154(b) by 369 days.

This patent is subject to a terminal disclaimer.

(21) Appl. No.: 17/424,308

(22) PCT Filed: Dec. 18, 2019

(86) PCT No.: PCT/JP2019/049621
§ 371 (c)(1),
(2) Date: Jul. 20, 2021

(87) PCT Pub. No.: WO2020/153057
PCT Pub. Date: Jul. 30, 2020

(65) Prior Publication Data
US 2022/0134380 A1     May 5, 2022

(30) Foreign Application Priority Data

Jan. 21, 2019 (JP) ................. 2019-007754

(51) Int. Cl.
*B05D 7/26* (2006.01)
*B05D 7/00* (2006.01)
*B05D 7/02* (2006.01)
*B05D 7/14* (2006.01)
*C08F 212/08* (2006.01)
*C08F 220/14* (2006.01)
*C08F 220/18* (2006.01)
*C08F 220/56* (2006.01)
(Continued)

(52) U.S. Cl.
CPC ............... *B05D 7/572* (2013.01); *B05D 7/02* (2013.01); *B05D 7/14* (2013.01); *C08F 212/08* (2013.01); *C08F 220/14* (2013.01); *C08F 220/1802* (2020.02); *C08F 220/1804* (2020.02); *C08F 220/56* (2013.01); *C08G 18/6254* (2013.01); *C08G 18/775* (2013.01); *C08G 18/798* (2013.01); *C08K 3/013* (2018.01); *C08K 3/36* (2013.01); *C08K 9/06* (2013.01); *B05D 2201/02* (2013.01); *B05D 2202/00* (2013.01); *B05D 2401/20* (2013.01); *B05D 2425/01* (2013.01); *B05D 2425/02* (2013.01); *B05D 2425/03* (2013.01); *B05D 2451/00* (2013.01); *B05D 2502/00* (2013.01); *B05D 2503/00* (2013.01); *B05D 2508/00* (2013.01); *B05D 2601/22* (2013.01); *C08K 2201/003* (2013.01); *C08K 2201/011* (2013.01)

(58) Field of Classification Search
CPC .......... B05D 7/572; B05D 7/14; C08K 3/013; C08F 220/14
See application file for complete search history.

(56) References Cited

U.S. PATENT DOCUMENTS 5,346,958 A * 9/1994 Yukawa ............... C09D 125/08
525/329.2
11,066,569 B2 * 7/2021 Luchi ................. C09D 133/066
(Continued)

FOREIGN PATENT DOCUMENTS

CN 105542061 A * 2/2016 ........... C09D 133/12
EP 0403779 A2 * 12/1990 ............. C08G 18/73
(Continued)

OTHER PUBLICATIONS

Suchithra, P. S., et al., "Effect of Hydroxyl Value of Acrylic Polyol and Type of Crosslinkers on the Properties of Polyurethane Coatings". Moroccan Journal of Chemistry 3, No. 3 (2015) pp. 476-483.*
Thomas, Jomin, et al., "Synthesis and characterization of solvent free acrylic copolymer for polyurethane coatings". Progress in Organic Coatings 145 (2020) 105677 pp. 1-7.*
Schimpf, Vitalij, et al., "Polyfunctional Acrylic Non-isocyanate Hydroxyurethanes as Photocurable Thermosets for 3D Printing". Macromolecules 2019, 52, 3288-3297.*
(Continued)

*Primary Examiner* — Bret P Chen
(74) *Attorney, Agent, or Firm* — Birch, Stewart, Kolasch & Birch, LLP

(57) ABSTRACT

A method includes a step of applying an aqueous 2-package type first colored paint to form an uncured first colored coating film; a step of applying an aqueous 1-package type second colored paint to form an uncured second colored coating film; a step of applying a solvent-based 2-package type clear paint to form an uncured clear coating film; and a step of heating the uncured first colored coating film, the uncured second colored coating film and the uncured clear coating film to 75 to 100° C. to simultaneously cure these films. The solvent-based 2-package type clear paint contains a hydroxyl group-containing acrylic resin and a polyisocyanate compound in a ratio of 1.5 to 2.0 equivalents of isocyanate groups in the polyisocyanate compound relative to 1 equivalent of hydroxyl groups in the hydroxyl group-containing acrylic resin.

7 Claims, No Drawings

(51) Int. Cl.
  *C08G 18/62* (2006.01)
  *C08G 18/77* (2006.01)
  *C08G 18/79* (2006.01)
  *C08K 3/013* (2018.01)
  *C08K 3/36* (2006.01)
  *C08K 9/06* (2006.01)

(56) References Cited

U.S. PATENT DOCUMENTS

| | | | |
|---|---|---|---|
| 2004/0191418 A1* | 9/2004 | Suwama | C08G 18/4283 427/372.2 |
| 2004/0241450 A1* | 12/2004 | Ogawa | C09D 175/04 427/402 |
| 2005/0095398 A1* | 5/2005 | Watanabe | C09D 133/06 428/131 |
| 2006/0030651 A1* | 2/2006 | Kubish | C09D 5/024 523/221 |
| 2008/0220275 A1* | 9/2008 | Noguchi | C08F 220/1804 427/407.1 |
| 2008/0226891 A1* | 9/2008 | Chiga | C08G 18/792 428/221 |
| 2010/0273004 A1* | 10/2010 | Yamane | B05D 7/536 428/413 |
| 2011/0293948 A1 | 12/2011 | Tanaka et al. | |
| 2014/0065313 A1 | 3/2014 | Groenewolt et al. | |
| 2015/0147577 A1 | 5/2015 | Shigemori et al. | |
| 2015/0218405 A1 | 8/2015 | Iwata et al. | |
| 2016/0284255 A1* | 9/2016 | Henshue | G09F 7/00 |
| 2018/0104718 A1* | 4/2018 | Nakayabu | C08G 18/807 |
| 2018/0265717 A1* | 9/2018 | Watanabe | C09D 7/62 |
| 2022/0250115 A1* | 8/2022 | Ohnuki | B05D 3/0254 |

FOREIGN PATENT DOCUMENTS

| | | | | |
|---|---|---|---|---|
| JP | 61-74682 A | | 4/1986 | |
| JP | 2005-42001 A | | 2/2005 | |
| JP | 2011-131135 A | | 7/2011 | |
| JP | 2013-53305 A | | 3/2013 | |
| JP | 2013-212482 A | | 10/2013 | |
| JP | 2013-543041 A | | 11/2013 | |
| JP | 2014-14763 A | | 1/2014 | |
| JP | 2014-169434 A | | 9/2014 | |
| JP | 2014169434 A | * | 9/2014 | .......... B05D 1/36 |
| WO | WO 2008/050778 A1 | | 5/2008 | |
| WO | WO 2014/045657 A1 | | 3/2014 | |

OTHER PUBLICATIONS

International Search Report (PCT/ISA/210) issued in PCT/JP2019/049621, dated Mar. 10, 2020.

* cited by examiner

METHOD FOR FORMING A MULTILAYER COATING FILM

TECHNICAL FIELD

The present disclosure relates to a method for forming a multilayer coating film, the method enabling a formation of a multilayer coating film on both a metal member and a plastic member of an automobile outer panel.

BACKGROUND ART

In automotive painting, a method of forming a multilayer coating film by a 3-coat 2-bake (3C2B) system has been widely adopted, the system including the steps performed in the following order: application of an electrodeposition paint on a substrate, application of an intermediate paint, bake curing, application of an aqueous base coating paint, preheating, application of a clear paint, and bake curing. However, in recent years, from the viewpoint of energy saving, a 3-coat 1-bake (3C1B) system has been attempted, this system omitting the bake curing after the application of an intermediate paint to only include the steps performed in the following order: application of an electrodeposition paint on a substrate, application of an aqueous intermediate paint, preheating, application of an aqueous base coating paint, preheating, application of a clear paint, and bake curing.

Also, in recent years, for the purposes of reducing the facility cost in manufacturing process of automobile outer panels and of matching the color tones of metal members and plastic members, there has been a demand for a method for integrally painting metal members and plastic members fitted to the metal members.

For example, Patent Document 1 discloses a coating method for continuously coating an automobile body, in which: after applying an undercoat material on an automobile body, resinous parts are fitted to the body; a conductive primer is applied mainly on the resinous parts; an intermediate paint is wholly applied; and then a top paint is applied so as to integrally paint the resinous parts and the automobile body.

Further, Patent Document 2 discloses a method for forming a multilayer coating film, in which: an aqueous intermediate paint is applied on a base substrate having both a steel plate and a plastic base material so as to form an intermediate coating film; an aqueous base paint is applied on the formed intermediate coating film so as to form a base coating film; an organic solvent type clear paint is applied so as to form a clear coating film; and the three layers of the intermediate coating film, the base coating film and the clear coating film are heated to cure, the aqueous base paint containing, in 100% by mass of solid resin content, (a) 10 to 60% by mass of solid content of an acrylic resin emulsion obtained by emulsion polymerization of a monomer mixture having 0.2 to 20% by mass of a crosslinking monomer, (b) 5 to 40% by mass of solid content of a water-soluble acrylic resin, and (c) 20 to 40% by mass of solid content of a melamine resin, and (d) 10 to 40 parts by mass of a propylene glycol monoalkyl ether relative to 100 parts by mass of solid resin content.

CITATION LIST

Patent Literature

[Patent Literature 1] Japanese Unexamined Patent Application Publication No. S61(1986)-74682
[Patent Literature 2] Japanese Unexamined Patent Application Publication No. 2011-131135

SUMMARY OF THE DISCLOSURE

Technical Problem

However, if the baking temperature is lowered in the aforementioned methods, it becomes difficult to ensure the performance of the coating film such as finished appearance and water resistance. Also from the viewpoint of further energy saving, there is a demand for an integrated coating system that can cure a coating film at a lower temperature while maintaining the performance of the coating film.

The present disclosure has been made in view of such circumstances and directed to solve these problems by providing a method for forming a multilayer coating film which enables a formation of a coating film excellent in low temperature curing properties and finished appearance on both a metal member and a plastic member of an automobile outer panel.

Solution to the Problem

A method for forming a multilayer coating film according to the present disclosure includes: a step (1) of applying an aqueous 2-package type first colored paint (X) on both a metal member and a plastic member of an automobile outer panel so as to form an uncured first colored coating film; a step (2) of applying an aqueous 1-package type second colored paint (Y) on the uncured first colored coating film obtained in step (1) so as to form an uncured second colored coating film; a step (3) of applying a solvent-based 2-package type clear paint (Z) on the uncured second colored coating film obtained in step (2) so as to form an uncured clear coating film; and a step (4) of heating the uncured first colored coating film, the uncured second colored coating film and the uncured clear coating film formed in steps (1) to (3) to 75 to 100° C. so as to simultaneously cure these coating films. In the method, the solvent-based 2-package type clear paint (Z) contains a hydroxyl group-containing acrylic resin (Z1) and a polyisocyanate compound (Z2) in a ratio of 1.5 to 2.0 equivalents of isocyanate groups in the polyisocyanate compound (Z2) relative to 1 equivalent of hydroxyl groups in the hydroxyl group-containing acrylic resin (Z1); and the polyisocyanate compound (Z2) contains a polyisocyanate compound having a uretdione structure and a compound of a trimer or more of diisocyanate in a weight ratio of solid content within a range of 10/90 to 50/50.

It is preferable that the aqueous 2-package type first colored paint (X) contains a hydroxyl group-containing polyester resin (X1), a hydroxyl group-containing acrylic resin (X2), a hydroxyl group-containing polyurethane resin (X3), and a polyisocyanate compound (X4) in a ratio of 1.5 to 2.0 equivalents of isocyanate groups in the polyisocyanate compound (X4) relative to 1 equivalent of hydroxyl groups in the hydroxyl group-containing polyester resin (X1), the hydroxyl group-containing acrylic resin (X2), and the hydroxyl group-containing polyurethane resin (X3).

It is preferable that the aqueous 1-package type second colored paint (Y) contains a hydroxyl group-containing polyester resin (Y1), a hydroxyl group-containing acrylic resin (Y2), a hydroxyl group-containing polyurethane resin (Y3), and a melamine resin (Y4); and water absorption of the second colored coating film is 6.5% or less at 20° C.

It is preferable that the plastic member is coated with a primer in advance.

It is preferable that the plastic member is made of a composite material of a polyamide resin and a modified polyphenylene ether resin.

The solvent-based 2-package type clear paint (Z) may further contain polysiloxane modified silica particles (Z3) having a mean primary particle diameter of 1 to 40 nm.

The solvent-based 2-package type clear paint (Z) may further contain a coloring pigment.

Advantageous Effects of the Disclosure

According to the present inventive method, a multilayer coating film excellent in low temperature curing properties and finished appearance can be formed on both a metal member and a plastic member of an automobile outer panel.

DESCRIPTION OF EMBODIMENTS

Hereinafter, a method for forming a multilayer coating film of the present disclosure will be described for each step in order.

Step (1)

In step (1) of the disclosure, an aqueous 2-package type first colored paint (X) is applied on both a metal member and a plastic member of an automobile outer panel to form an uncured first colored coating film.

Examples of the material of the metal member include iron, aluminum, brass, copper, tin plate, stainless steel, zinc-plated steel, and zinc-alloy (e.g., Zn—Al, Zn—Ni and Zn—Fe)-plated steel. It is desirable that the surface of the metal member has been subjected to a surface treatment such as phosphate treatment, chromate treatment and complex oxide treatment. It is more desirable that the surface has been further subjected to a cationic electrodeposition coating.

Examples of the material of the plastic member include polyolefins obtained by (co)polymerizing one or two or more olefins having 2 to 10 carbon atoms such as ethylene, propylene, butylene and hexene; and composite materials of: a modified polyphenylene ether resin; and a polycarbonate, an ABS resin, a urethane resin, a polyamide resin, or a polyamide resin. Examples of the plastic member include bumpers, spoilers, grills, fenders. These plastic members may be pre-coated with a primer as needed. As the primer, a conventionally known primer containing a chlorinated polyolefin, a blocked isocyanate resin, an epoxy resin, or the like can be used.

The metal member and the plastic member can be assembled by a known method.

The aqueous 2-package type first colored paint (X) contains a hydroxyl group-containing polyester resin (X1), a hydroxyl group-containing acrylic resin (X2), a hydroxyl group-containing polyurethane resin (X3), and a polyisocyanate compound (X4) as film-forming components. These are contained in a ratio of 1.5 to 2.0 equivalents of isocyanate groups in the polyisocyanate compound (X4) relative to 1 equivalent of hydroxyl groups in the hydroxyl group-containing polyester resin (X1), the hydroxyl group-containing acrylic resin (X2), and the hydroxyl group-containing polyurethane resin (X3).

The hydroxyl group-containing polyester resin (X1) encompasses those obtained by neutralizing a polyester resin prepared by means of esterification reaction usually using a polyhydric alcohol and a polybasic acid, as well as, if necessary, a monobasic acid, an oil component (including fatty acid thereof) and the like. It is suitable that the weight average molecular weight of the polyester resin is generally within a range of about 3,000 to 100,000, preferably 4,000 to 70,000, and more preferably 5,000 to 30,000.

Examples of the polyhydric alcohol include ethylene glycol, diethylene glycol, propylene glycol, butanediol, pentanediol, hexanediol, 2,2-dimethylpropanediol, glycerin, trimethylolpropane, pentaerythritol, and ethylene oxide adducts or propylene oxide adducts of bisphenol compounds. These may be used alone or in combination of two or more thereof.

Examples of the polybasic acid include phthalic acid, isophthalic acid, tetrahydrophthalic acid, hexahydrophthalic acid, maleic acid, succinic acid, adipic acid, sebacic acid, trimellitic acid, pyromellitic acid, and anhydrides thereof. These may be used alone or in combination of two or more thereof. Examples of the monobasic acid include benzoic acid and t-butylbenzoic acid. Examples of the oil component include castor oil, dehydrated castor oil, safflower oil, soybean oil, linseed oil, tall oil, coconut oil, and fatty acids thereof. These may be used alone or in combination of two or more thereof.

In the polyester resin described above, carboxyl groups can be introduced by a combined use of polybasic acids such as trimellitic acid and pyromellitic acid having 3 or more carboxyl groups per molecule as a part of a polybasic acid component, or by an addition of dicarboxylic acid by half-esterification. Hydroxyl groups can be readily introduced by a combined use of polyhydric alcohols such as glycerin and trimethylolpropane having 3 or more hydroxyl groups per molecule as a part of a polyhydric alcohol component.

The carboxylic groups in the hydroxyl group-containing polyester resin (X1) can be neutralized using a basic substance. The basic substance may be preferably a water-soluble one such as ammonia, methylamine, ethylamine, propylamine, butylamine, dimethylamine, trimethylamine, triethylamine, ethylenediamine, morpholine, methylethanolamine, dimethyl ethanolamine, diethanolamine, triethanolamine, diisopropanolamine, or 2-amino-2-methylpropanol. These may be used alone or in combination of two or more thereof.

The hydroxyl group-containing polyester resin (X1) preferably has an acid value generally within in a range of 10 to 100 mg KOH/g, specifically 20 to 80 mg KOH/g, especially 20 to 50 mg KOH/g; and a hydroxyl value generally within in a range of 10 to 300 mg KOH/g, specifically 30 to 200 mg KOH/g, especially 50 to 200 mg KOH/g.

The hydroxyl group-containing acrylic resin (X2) may be, for example, a water-soluble acrylic resin having a weight-average molecular weight of 5,000 to 100,000, preferably 10,000 to 90,000, and more preferably 20,000 to 80,000; or an acrylic resin emulsion having a weight average molecular weight of 50,000 or more, preferably 75,000 or more, and more preferably 100,000 or more, which are obtained by copolymerization of a monomer mixture composed of: a hydrophilic group-containing polymerizable unsaturated monomer such as a hydroxyl group-containing polymerizable unsaturated monomer or a carboxyl group-containing polymerizable unsaturated monomer; and other polymerizable unsaturated monomers.

Examples of the hydroxyl group-containing polymerizable unsaturated monomer include hydroxyalkyl esters of acrylic acid or methacrylic acid such as 2-hydroxyethyl (meth)acrylate, 2- or 3-hydroxypropyl (meth)acrylate, and 4-hydroxybutyl(meth)acrylate; polyethylene glycol (meth) acrylate; and polypropylene glycol (meth)acrylate. These may be used alone or in combination of two or more thereof.

Examples of the carboxyl group-containing polymerizable unsaturated monomer include (meth)acrylic acid, crotonic acid, maleic acid, fumaric acid, itaconic acid and a half-monoalkyl esterified product of dicarboxylic acids thereof. Examples of the hydrophilic group-containing polymerizable unsaturated monomer other than these include a polyalkylene chain containing polymerizable unsaturated monomer such as polyethylene glycol (meth)acrylate, and polypropylene glycol (meth)acrylate.

Examples of the aforementioned other polymerizable unsaturated monomers include alkyl esters or cycloalkyl esters of (meth)acrylic acid having 1 to 24 carbon atoms such as methyl(meth)acrylate, ethyl (meth)acrylate, n-propyl(meth)acrylate, i-propyl(meth)acrylate, n-butyl(meth)acrylate, i-butyl(meth)acrylate, t-butyl(meth)acrylate, 2-ethylhexyl (meth)acrylate, cyclohexyl (meth)acrylate, lauryl (meth)acrylate, or isobornyl (meth)acrylate; hydroxyalkyl esters of (meth)acrylic acid such as 2-hydroxyethyl (meth)acrylate, 2- or 3-hydroxypropyl (meth)acrylate, and 4-hydroxybutyl (meth)acrylate; glycidyl (meth)acrylate; acrylonitrile; acrylamide; styrene; vinyltoluene; vinyl acetate; vinyl chloride; and 1,6-hexanediol diacrylate. These may be used alone or in combination of two or more thereof.

The copolymerization of the monomer mixture mentioned above can be carried out by a method known per se, i.e., a solution polymerization method when the water-soluble acrylic resin is desired, or an emulsion polymerization method when the acrylic resin emulsion is desired, for example.

When the hydroxyl group-containing acrylic resin (X2) is an acrylic resin emulsion obtained by emulsion polymerization, it may be a multilayered particulate emulsion obtained by emulsion polymerization of the monomer mixture at multiple stages in the presence of water and an emulsifier.

The carboxylic groups of the hydroxyl group-containing acrylic resin (X2) can be neutralized by using the basic substance described above, as needed.

It is preferable that the hydroxyl group-containing acrylic resin (X2) generally has an acid value within in a range of 10 to 100 mg KOH/g, specifically 15 to 80 mg KOH/g, especially 20 to 60 mg KOH/g; and a hydroxyl value generally within in a range of 10 to 250 mg KOH/g, specifically 20 to 200 mg KOH/g, especially 30 to 150 mg KOH/g.

The hydroxyl group-containing polyurethane resin (X3) may preferably be a hydrophilic polyurethane resin which can be dissolved or dispersed in water. For example, the hydroxyl group-containing polyurethane resin (X3) may preferably be an aqueous dispersion of a self-emulsifying urethane resin having a mean particle diameter of 0.001 to 1.0 μm, particularly 0.02 to 0.3 μm, which can be obtained by means of chain extension and emulsification of a urethane prepolymer obtained by, after or while neutralizing, reacting in a one-shot process or a multistage process, e.g., (i) an aliphatic and/or alicyclic diisocyanate, (ii) a diol having a number average molecular weight of 500 to 5,000, (iii) a low molecular weight polyhydroxyl compound, and (iv) a dimethylol alkanoic acid with each other in an NCO/OH equivalent ratio generally within a range of 1/0.5 to 1/0.95, especially 1/0.6 to 1/0.9; and particularly of which a part or all of the organic solvent used in the production process has been distilled.

The hydroxyl group-containing polyurethane resin (X3) preferably has an acid value generally within a range of 10 to 60 mg KOH/g, specifically 20 to 50 mg KOH/g, particularly 20 to 40 mg KOH/g; and a hydroxyl value generally within a range of 10 to 60 mg KOH/g, specifically 20 to 50 mg KOH/g, particularly 20 to 40 mg KOH/g.

The polyisocyanate compound (X4) is a compound having at least two unblocked isocyanate groups per molecule. Examples of the polyisocyanate compound (X4) include aliphatic polyisocyanates, alicyclic polyisocyanates, aromatic aliphatic polyisocyanates, aromatic polyisocyanates, and derivatives thereof. Examples of the derivatives of the polyisocyanates include dimers, trimers, biurets, allophanates, uretdiones and isocyanurates of the polyisocyanates mentioned above.

These polyisocyanates and derivatives may be used alone or in combination of two or more thereof. Among these polyisocyanates, it is preferable to use aliphatic diisocyanates, alicyclic diisocyanates and derivatives thereof alone or in combination of two or more.

As the polyisocyanate compound (X4), a water dispersible polyisocyanate compound is preferably used from the viewpoint of smoothness of an obtained coating film. The water dispersible polyisocyanate compound may be any polyisocyanate compound without limitation as long as it can be stably dispersed in an aqueous medium. In particular, the water dispersible polyisocyanate compound may preferably be a hydrophilized polyisocyanate compound modified to be hydrophilic (X4-1), a polyisocyanate compound to which water dispersibility was imparted by pre-mixing the polyisocyanate compound (X4) with a surfactant, or the like.

Examples of the hydrophilized polyisocyanate compound (X4-1) include: an anionic hydrophilized polyisocyanate compound (X4-1-1) obtained by reacting an active hydrogen group of an active hydrogen group-containing compound having an anionic group with an isocyanate group of a polyisocyanate compound; and a nonionic hydrophilized polyisocyanate compound (X4-1-2) obtained by reacting a hydrophilic polyether alcohol such as a polyoxyethylene monoalcohol with a polyisocyanate compound. These may be used alone or in combination of two or more thereof.

The active hydrogen group-containing compound having an anionic group encompasses a compound which has an anionic group such as a carboxyl group, a sulfonic acid group, a phosphate group, or a betaine structure containing group, and can react with an isocyanate group: and of which example is a compound having an active hydrogen group such as a hydroxyl group or an amino group. Reaction between such compound and a polyisocyanate compound can impart hydrophilicity to the polyisocyanate compound. The anionic hydrophilized polyisocyanate compound (X4-1-1) is preferably a compound having a sulfonic acid group.

It is preferable from the viewpoint of the low temperature curing properties that the aqueous 2-package type first colored paint (X) contains the hydroxyl group-containing polyester resin (X1), the hydroxyl group-containing acrylic resin (X2), the hydroxyl group-containing polyurethane resin (X3), and the polyisocyanate compound (X4) in a ratio of 1.5 to 2.0, especially 1.5 to 1.9 equivalents of isocyanate groups in the polyisocyanate compound (X4) relative to 1 equivalent of hydroxyl groups in the hydroxyl group-containing polyester resin (X1), the hydroxyl group-containing acrylic resin (X2) and the hydroxyl group-containing polyurethane resin (X3).

The aqueous 2-package type first colored paint (X) may contain, appropriately as needed, paint additives such as pigments such as coloring pigments and body pigments, curing agents other than the polyisocyanate compound (X4) such as a melamine resin, curing catalysts, thickening agents, ultraviolet absorbers, photostabilizers, anti-foaming agents, plasticizers, organic solvents, surface modification agents, and anti-settling agents.

The aqueous 2-package type first colored paint (X) can be applied on a substrate by a known method such as air spray coating, airless spray coating, rotary atomization coating or curtain coating, and an electrostatic charge may be applied during the coating. Among these, the methods of air spray coating, rotary atomization coating and the like are preferable. The coating amount of the aqueous 2-package type first colored paint (X) is preferably an amount at which the thickness of a cured film is generally 10 to 15 µm, preferably 10 to 40 µm.

Step (2)

In step (2) of the present disclosure, an aqueous 1-package type second colored paint (Y) is applied on the uncured first colored coating film obtained in step (1) so as to form an uncured second colored coating film.

The aqueous 1-package type second colored paint (Y) used in the present disclosure contains a hydroxyl group-containing polyester resin (Y1), a hydroxyl group-containing acrylic resin (Y2), a hydroxyl group-containing polyurethane resin (Y3), and a melamine resin (Y4) as film forming components. The aqueous 1-package type second colored paint (Y) can be prepared by dispersing these resin components and colored components such as coloring pigments and effect pigments in an aqueous medium.

As the hydroxyl group-containing polyester resin (Y1), the hydroxyl group-containing acrylic resin (Y2), and the hydroxyl group-containing polyurethane resin (Y3), those explained above for the hydroxyl group-containing polyester resin (X1), the hydroxyl group-containing acrylic resin (X2), and the hydroxyl group-containing polyurethane resin (X3) can be used respectively as appropriate.

The melamine resin (Y4) may be a butyl/methyl mixed ether-modified melamine resin having a weight average molecular weight in a range of 1,500 to 3,000, preferably 1,500 to 2,500, more preferably 1,500 to 2,000. It is preferable that the mixed ether-modified melamine resin generally has an abundance molar ratio of butyl ether groups/methyl ether groups within a range of 4/6 to 9/1, particularly 5/5 to 9/1.

Examples of the coloring pigments used in the aqueous 1-package type second colored paint (Y) include, but are not limited to, titanium oxide, carbon black, yellow lead, yellow earth, yellow iron oxide, Hansa yellow, pigment yellow, chrome orange, chrome vermilion, permanent orange, umber, permanent red, brilliant carmine, fast violet, methyl violet lake, ultramarine blue, Prussian blue, cobalt blue, phthalocyanine blue, pigment green, and naphthol green. Examples of the effect pigments used in the aqueous 1-package type second colored paint (Y) include, but are not limited to, metallic pigments such as aluminum powder, vapor deposited aluminum, aluminum oxides, bronze powder, copper powder, tin powder, and micaceous iron oxides; and light interference pigments such as mica flakes coated with titanium oxides or iron oxides, and mica flakes. These pigments may be used alone or in combination of two or more thereof to form a solid color paint, a metallic paint or a light interference paint.

The aqueous 1-package type second colored paint (Y) may contain additives for paints as appropriate such as body pigments, curing agents other than the melamine resin (Y4), curing catalysts, thickening agents, ultraviolet absorbers, photostabilizers, anti-foaming agents, plasticizers, organic solvents, surface modification agents, and anti-settling agents.

The aqueous 1-package type second colored paint (Y) can be applied on the first colored coating film by a method known per se such as air spray coating, airless spray coating, rotary atomization coating, or curtain coating, and an electrostatic charge may be applied during the coating. Among these, the methods of air spray coating, rotary atomization coating and the like are preferable. The coating amount of the aqueous 1-package type second colored paint (Y) is preferably an amount at which the thickness of a cured film is generally 5 to 30 µm, and more preferably 10 to 20 µm.

According to the present disclosure, it is desirable that the second colored coating film of the aqueous 1-package type second colored paint (Y) has water absorption of 6.5% or less at 20° C. from the viewpoint of finished appearance and the like.

The water absorption of the second colored coating film is measured as follows. In conjunction with normal application on a substrate to be coated, the aqueous 1-package type second colored paint (Y) was also applied on an OHP film (XEROX FILM No. V515, available from Fuji Xerox Co., Ltd.) cut into a size of 10 cm×15 cm, of which weight (W1) was measured in advance. After preheating the OHP film as necessary, the weight (W2) of the OHP film coated with the aqueous 1-package type second colored paint (Y) was measured according to the time of application of a clearcoat paint. Thereafter, the OHP film coated with the aqueous 1-package type second colored paint (Y) was immersed in deionized water at 20° C. for 5 minutes and then removed from the water. After gently wiping excess water on the film with filter paper, the weight of the OHP film was measured (W3). The water absorption is calculated from the measurement results of W1 to W3 by the following equation (1).

$$\text{Water absorption (\%)} = \{(W3-W2)/(W2-W1)\} \times 100 \tag{1}$$

Step (3)

In step (3) of the disclosure, the solvent-based 2-package type clear paint (Z) is applied on the uncured second colored coating film obtained in step (2) so as to form an uncured clear coating film.

The solvent-based 2-package type clear paint (Z) contains a hydroxyl group-containing acrylic resin (Z1) and a polyisocyanate compound (Z2) in a ratio of 1.5 to 2.0 equivalents of isocyanate groups in the polyisocyanate compound (Z2) relative to 1 equivalent of hydroxyl groups in the hydroxyl group-containing acrylic resin (Z1); and the polyisocyanate compound (Z2) contains a polyisocyanate compound having a uretdione structure and a compound of a trimer or more of diisocyanate in a weight ratio of solid content within a range of 10/90 to 50/50.

The hydroxyl group-containing acrylic resin (Z1) can be usually produced by copolymerizing a hydroxyl group-containing unsaturated monomer and another unsaturated monomer copolymerizable therewith by a conventional method. The hydroxyl group-containing unsaturated monomer is a compound having at least one hydroxyl group and one polymerizable unsaturated bond per molecule. Examples of the hydroxyl group-containing unsaturated monomer include a monoesterified product of (meth)acrylic acid such as 2-hydroxyethyl (meth)acrylate, 2-hydroxypropyl (meth)acrylate, 3-hydroxypropyl (meth)acrylate, or 4-hydroxybutyl (meth)acrylate and a dihydric alcohol having 2 to 8 carbon atoms; an ε-caprolactone modified product of a monoesterified product of (meth)acrylic acid and a dihydric alcohol having 2 to 8 carbon atoms; allyl alcohol; and (meth) acrylate having a polyoxyethylene chain with a hydroxyl group at a molecular end.

Examples of the aforementioned another unsaturated monomer copolymerizable with the hydroxyl group-containing unsaturated monomer include alkyl esters or cycloalkyl esters having 1 to 24 carbon atoms of (meth)acrylic acid such as methyl(meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, cyclohexyl (meth)acrylate, lauryl (meth)acrylate, and isobornyl (meth)acrylate; (meth)acrylic acid, maleic acid, crotonic acid, β-carboxyethyl acrylate; glycidyl (meth)acrylate, acrylonitrile, acrylamide, styrene, and vinyltoluene. These may be used alone or in combination of two or more thereof.

The hydroxyl group-containing acrylic resin (Z1) preferably has a hydroxyl value within a range of 80 to 200 mg KOH/g, specifically 90 to 170 mg KOH/g, especially 100 to 140 mg KOH/g; and an acid value within a range of 1 to 40 mg KOH/g, specifically 3 to 30 mg KOH/g, especially 5 to 20 mg KOH/g from the viewpoints of the finished appearance such as smoothness and distinctness of image as well as the performance of the coating film such as weather resistance. The hydroxyl group-containing acrylic resin (Z1) preferably has a weight average molecular weight in a range of 4,000 to 20,000, specifically 6,000 to 16,000, especially 8,000 to 12,000 from the viewpoints of the finished appearance such as smoothness and distinctness of image as well as the performance of the coating film such as weather resistance.

The polyisocyanate compound (Z2) contains a polyisocyanate compound having a uretdione structure and a compound of a trimer or more of diisocyanate in a weight ratio of solid content within a range of 10/90 to 50/50, preferably 15/85 to 40/60, and more preferably 15/85 to 35/65. If the weight ratio of the polyisocyanate compound having a uretdione structure and the compound of a trimer or more of diisocyanate is out of those ranges, the curability of a completed multilayer coating film becomes insufficient, resulting in inadequate performance of the coating film. The weight ratio outside the ranges is not desirable.

The polyisocyanate compound having a uretdione structure may preferably be a uretdione of hexamethylene diisocyanate produced by a method known per se. As the compound of a trimer or more of diisocyanate, an isocyanurate, biuret, or allophanate of diisocyanate such as hexamethylene diisocyanate or isophorone diisocyanate can be used, for example.

The use ratio of the hydroxyl group-containing acrylic resin (Z1) and the polyisocyanate compound (Z2) is selected so as to be 1.5 to 2.0, especially 1.5 to 1.9 equivalents of isocyanate groups in the polyisocyanate compound (Z2) relative to 1 equivalent of hydroxyl groups in the hydroxyl group-containing acrylic resin (Z1) from the viewpoint of ensuring the curability of the multilayer coating film.

The solvent-based 2-package type clear paint (Z) may contain polysiloxane modified silica particles (Z3) having a mean primary particle diameter of 1 to 40 nm, if necessary from the viewpoint of scratch resistance.

The polysiloxane modified silica particles (Z3) are silica particles having a structure in which the particle surface is modified by a polysiloxane chain. The polysiloxane modified silica particles (Z3) may be any conventionally known one such as commercially available products including "NANOBYK-3650", "NANOBYK-3651" and "NANOBYK-3652" (trade names, available from BYK-Chemie GmbH).

The mean primary particle diameter means a particle diameter at which the cumulative particle size distribution is 50% from the small particle size side in the volume-based particle size distribution (D50).

The solvent-based 2-package type clear paint (Z) may further contain as needed a coloring pigment to the extent that it does not interfere with transparency. The solvent-based 2-package type clear paint (Z) may further contain body pigments, ultraviolet absorbers, photostabilizers, antifoaming agents, thickening agents, rust inhibitors, and surface modification agents as appropriate.

The solvent-based 2-package type clear paint (Z) can be applied on the second colored coating film by a method known per se such as air spray coating, airless spray coating, rotary atomization coating or curtain coating, and an electrostatic charge may be applied during the coating. Among these, the methods of air spray coating, rotary atomization coating and the like are preferable. The coating amount of the solvent-based 2-package type clear paint (Z) is preferably an amount at which the thickness of a cured film is generally 20 to 50 μm, preferably 30 to 45 μm.

Step (4)

In step (4) of the present disclosure, the uncured first colored coating film, the uncured second colored coating film, and the uncured clear coating film formed in steps (1) to (3) are heated to 75 to 100° C. so as to simultaneously cure these coating films.

The curing of the first colored coating film, the second colored coating film, and the clear coating film can be performed by ordinary means for baking coating films such as hot air heating, infrared radiation heating and high-frequency heating. The heating time is not particularly limited, but preferably it is usually about 10 to 60 minutes, especially about 15 to 40 minutes. Such heating can simultaneously cure a multilayer coating film formed of the three layers of the first colored coating film, the second colored coating film, and the clear coating film.

More preferably, the heating temperature is between 80° C. and 90° C.

EXAMPLES

The present disclosure will now be explained in greater detail by means of Examples and Comparative examples. However, the present disclosure is in no way limited to these Examples. Note that both "parts" and "%" are by weight.

<Production of Aqueous 2-package type first colored paint (X)>

Production Example 1

A pigment dispersion paste was obtained by: mixing 44.2 parts of a hydroxyl group-containing polyester resin solution (a) (20 parts of solid resin content), 60 parts of "JR-806" (trade name, available from TAYCA CORPORATION, rutile-type titanium dioxide), 1 part of "Carbon MA-100" (trade name, available from Mitsubishi Chemical Corporation, carbon black), 30 parts of "Variace B-35" (trade name, available from SAKAI CHEMICAL INDUSTRY CO., LTD., barium sulfate powder, mean primary particle diameter of 0.5 μm), 5 parts of "MICRO ACE S-3" (trade name, available from NIPPON TALC Co., Ltd., talc powder, mean primary particle diameter of 4.8 μm), and 45 parts of deionized water; adjusting the pH to 8.0 by means of 2-(dimethylamino)ethanol; and dispersing the mixture in a paint shaker for 30 minutes.

Next, 180 parts of the obtained pigment dispersion paste (20 parts of resin solid content), 66.7 parts of a hydroxyl group-containing acrylic resin dispersion (b) (20 parts of resin solid content), 11.1 parts of the hydroxyl group-containing polyester resin solution (a) (5 parts of resin solid content), 78 parts of "UCOAT UX-5210" (trade name, available from Sanyo Chemical Industries, Ltd., polycarbonate-based aqueous polyurethane resin, solid content of 32%) (25 parts of resin solid content), 0.1 part of tin catalyst "Scat-1W" (available form Sankyo Chemical Co., Ltd., trade name, butyltin-based compound), 2-(dimethylamino) ethanol, and deionized water were added. Then, the pH was adjusted. Further, a sulfonic acid-modified polyisocyanate compound solution (c) was uniformly mixed in an amount such that the NCO/OH ratio was 1.7. Thus, the aqueous first colored paint (X-1) having a pH of 8.0 and a viscosity of 55 seconds at a temperature of 20° C. using a No. 4 Ford cup was obtained.

Here, the hydroxyl group-containing polyester resin solution (a), the hydroxyl group-containing acrylic resin dispersion (b), and the sulfonic acid-modified polyisocyanate compound solution (c) of Production Example 1 will be described.

Hydroxyl Group-Containing Polyester Resin Solution (a)

In a reaction vessel equipped with a temperature gauge, a thermostat, a stirrer, a reflux condenser and a water separator, 174 parts of trimethylolpropane, 327 parts of neopentyl glycol, 352 parts of adipic acid, 109 parts of isophthalic acid, and 101 parts of hexahydrophthalic anhydride were charged and heated over the course of 3 hours so as to raise the temperature from 160° C. to 230° C. The temperature of 230° C. was maintained while distilling generated condensation water by the water separator, and the reaction was allowed to progress until the acid value reached 3 mg KOH/g or less. To this reaction product, 59 parts of trimellitic anhydride was added. The addition reaction was allowed to progress for 30 minutes at 170° C. Then, 2-(dimethylamino)ethanol was added in an amount of equivalents relative to the acid groups to neutralize the reaction, and deionized water was gradually added to disperse the mixture in the water. Thus, a polyester resin solution having a solid content concentration of 45% and a pH of 7.2 was obtained. The obtained polyester resin had an acid value of 35 mg KOH/g, and a hydroxyl value of 130 mg KOH/g.

Hydroxyl Group-Containing Acrylic Resin Dispersion (b)

In a reaction vessel equipped with a temperature gauge, a thermostat, a stirrer, a reflux condenser, a nitrogen inlet tube and a dropping device, 130 parts of deionized water and 0.52 parts of AQUALON KH-10 (trade name, available from DKS Co. Ltd.) were charged, stirred and mixed in a stream of nitrogen, and heated to 80° C. Next, 1% of the total quantity of a monomer emulsion (1) described below and 5.3 parts of a 6% ammonium persulfate solution were introduced into the reaction vessel, and it was maintained at the temperature of 80° C. for 15 minutes. Thereafter, the remainder of the monomer emulsion (1) was added dropwise over the course of 3 hours into the reaction vessel maintained at the said temperature. After the completion of the dropwise addition, the mixture in the vessel was allowed to age for 1 hour. A monomer emulsion (2) described below was then added dropwise in the vessel over the course of 1 hour, and the mixture was allowed to age for 1 hour. The mixture was then cooled to 30° C. while gradually adding 40 parts of a 5% dimethylethanolamine aqueous solution in the reaction vessel, and filtered through a 100 mesh nylon cloth such that its filtrate was discharged. Thus, the hydroxyl group-containing acrylic resin dispersion was obtained, the dispersion having: a mean particle diameter of 100 nm (measured at 20° C. after being diluted with deionized water by using a submicron particle size distribution measurement device "COULTER N4" available from Beckman Coulter, Inc.); and a solid content concentration of 30%. The obtained acrylic resin had an acid value of 33 mg KOH/g, and a hydroxyl value of 25 mg KOH/g.

—Monomer Emulsion (1)—

The monomer emulsion (1) was obtained by mixing and stirring 42 parts of deionized water, 0.72 parts of "Aqualon KH-10", 2.1 parts of methylene bisacrylamide, 2.8 parts of styrene, 16.1 parts of methyl methacrylate, 28 parts of ethyl acrylate, and 21 parts of n-butyl acrylate.

—Monomer Emulsion (2)—

The monomer emulsion (2) was obtained by mixing and stirring 18 parts of deionized water, 0.31 parts of "Aqualon KH-10", 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate.

Sulfonic Acid-Modified Polyisocyanate Compound Solution (c)

A sulfonic acid-modified polyisocyanate compound solution having a solid content of 80% and an NCO content of 16.0% was obtained by stirring 970 g (5.00 mol) of hexamethylene diisocyanate (HDI)-based polyisocyanate containing isocyanurate groups with an NCO content of 21.7%, an average NCO functionality of 3.5 (by GPC), a monomer HDI content of 0.1% and a viscosity of 3000 mPa·s (23° C.); 30 g (0.14 mol) of 3-(cyclohexylamino)propanesulfonic acid; 17.4 g (0.14 mol) of dimethylcyclohexylamine; and 254 g of 1-methoxypropyl 2-acetate under dry nitrogen at 80° C. for 5 hours to allow reaction therebetween.

Production Example 2

The aqueous first colored paint (X-2) was obtained in the same way as in Production Example 1, except that the amount of the sulfonic acid-modified polyisocyanate compound solution (c) was set to have an NCO/OH ratio of 1.5.

Production Example 3

The aqueous first colored paint (X-3) was obtained in the same way as in Production Example 1, except that the amount of the sulfonic acid-modified polyisocyanate compound solution (c) was set to have an NCO/OH ratio of 1.3.

<Production of Aqueous 1-Liquid Type Second Colored Paint (Y)>

Production Example 4

The aqueous second colored paint (Y-1) was obtained in a following manner. To 35.7 parts of a hydroxyl group-containing polyester resin (d) (25 parts of solid resin content), 12.5 parts of melamine resin (methyl-butyl mixed etherified melamine resin) having a solid content of 80% (10 parts of solid resin content), 183 parts of the hydroxyl group-containing acrylic resin dispersion (b) (55 parts of solid resin content), and 31 parts of "UCOAT UX-5210" (trade name, available from Sanyo Chemical Industries, Ltd., polycarbonate-based aqueous polyurethane resin, solid content of 32%) (10 parts of resin solid content) were added. Then, as an aluminum pigment, 20 parts of "ALUMINIUM PASTE GX180A" (available form Asahi Kasei Corp., trade name, aluminum flake paste) was added while stirring to be mixed and dispersed in the mixture. Further, dimethylethanolamine and deionized water were added to adjust such that the pH is 8.0 and the viscosity is 50 seconds at 20° C. by measurement using a No. 4 Ford Cup. The water absorption of the second colored coating film of the paint (Y-1) was 6% at 20° C.

Here, the hydroxyl group-containing polyester resin (d) in Production Example 4 described above will be described.

Hydroxyl Group-Containing Polyester Resin (d)

In a reaction vessel equipped with a temperature gauge, a thermostat, a stirrer, a reflux condenser and a water separator, 109 parts of trimethylolpropane, 141 parts of 1,6-hexanediol, 126 parts of hexahydrophthalic anhydride, and 120 parts of adipic acid were charged and heated over the course of 3 hours so as to raise the temperature from 160° C. to 230° C. The condensation reaction was allowed to progress at 230° C. for 4 hours. Next, in order to add carboxyl groups to the obtained condensation reaction product, 38.3 parts of trimellitic anhydride was further added. The mixture was allowed to react for 30 minutes at 170° C., and then diluted with 2-ethyl-1-hexanol. Thus, the polyester resin solution having a resin solid concentration of 70% was obtained. The obtained polyester resin had an acid value of 46 mg KOH/g, and a hydroxyl value of 150 mg KOH/g.

<Production of Solvent-Based 2-Package Type Clear Paint (Z)>

Production Example 5

An isocyanate cross-linking agent (Z2-1) (consisting of hexamethylene diisocyanate uretdiones of 20% and trimers or more of 80%, NCO content of 20%, viscosity of 800 mPa·s at 25° C.) was uniformly mixed with 70 parts of a hydroxyl group-containing acrylic resin (e) by solid content weight in an amount such that the NCO/OH ratio was 1.7. The mixture was then mixed with an organic solvent (a SOLVESSO 100/methoxypropylacetate equal-weight mixture). Thus, a clear paint (Z-1) adjusted so as to have a viscosity of 20 seconds at 20° C. measured using a No. 4 Ford Cup was obtained.

Here, the hydroxyl group-containing acrylic resin (e) in Production Example 5 will be described.

Hydroxyl Group-Containing Acrylic Resin (e)

The hydroxyl group-containing acrylic resin (e) is an acrylic resin having a hydroxyl value of 120 mg KOH/g and a weight average molecular weight of 8,000 which is obtained by radical polymerization reaction between 25 parts of styrene, 20 parts of n-butyl methacrylate, 30 parts of n-butyl acrylate, 24 parts of hydroxyethyl methacrylate and 1 part of acrylic acid using a conventional method.

Production Example 6

A clear paint (Z-2) was obtained in the same manner as in Production Example 5, except that the amount of the isocyanate crosslinking agent (Z2-1) was set such that the NCO/OH ratio was 1.5.

Production Example 7

A clear paint (Z-3) was obtained in the same manner as in Production Example 5, except that 2 parts of "NANOBYK-3652" (available from BYK, trade name, linear alkyl group-modified polydimethylsiloxane-modified silica particle dispersion, mean particle diameter of 20 nm, solid content concentration of 31% [silica particle concentration of 25%]) were added.

Production Example 8

An isocyanate crosslinking agent (Z2-2) (consisting of hexamethylene diisocyanate uretdiones of less than 1% and trimers or more of 99% or more, NCO content of 20%, viscosity of 1,200 mPa·s at 25° C.) was uniformly mixed with 70 parts of the hydroxyl group-containing acrylic resin (e) by solid content weight in an amount such that the NCO/OH ratio was 1.7. The mixture was then mixed with an organic solvent (a toluene/xylene equal-weight mixture). Thus, a clear paint (Z-4) adjusted so as to have a viscosity of 14 seconds at 20° C. measured using a No. 4 Ford Cup was obtained.

Production Example 9

A clear paint (Z-5) was obtained in the same manner as in Production Example 6, except that the amount of the isocyanate crosslinker (Z2-1) was set such that the NCO/OH ratio was 1.2.

Production Example 10

A clear paint (Z-6) was obtained in the same manner as in Production Example 6, except that the amount of the isocyanate crosslinker (Z2-1) was set such that the NCO/OH ratio was 2.2.

Examples 1 to 7 and Comparative examples 1 to 3

(Preparation of Test Sheets 1 and 2)

As a metal member, a zinc phosphate-treated cold rolled steel sheet (450 mm×300 mm×0.8 mm) was electrodeposition-coated with a thermosetting epoxy resin based cationic electrodeposition paint composition (product name "Elecron NT-360", available from Kansai Paint Co., Ltd.) so as to form a film having a thickness of 20 μm, and heated for 30 minutes at 170° C. to cure.

As a plastic member, a polypropylene sheet (which had been degreased) was air-spray coated with a primer "SOFLEX 3100" (trade name, Kansai Paint Co., Ltd.) so as to have a dried film with thickness of 7 μm, and heated for 30 minutes at 80° C. to cure. The surfaces of the metal member and the plastic member were then degreased. These members were arranged adjacent to each other to form a test sheet 1.

As another plastic member, a NORYL GTX sheet (which had been degreased) was air-spray coated with a primer "SOFLEX 3100" (trade name, Kansai Paint Co., Ltd.) so as to have a dried film with thickness of 7 μm, and heated for 30 minutes at 80° C. to cure. The surfaces of the metal member and this plastic member were then degreased. These members were arranged adjacent to each other to form a test sheet 2.

(Preparation of Coated Test Sheet)

The aqueous-based first colored paints (X-1) to (X-3) prepared in the manners described above were electrostatically applied on the test sheets described above in the combinations shown in Table 1 so as to have a dried film with thickness of 20 and were allowed to set at room temperature for 3 minutes. Then, the aqueous second colored paint (Y-1) was electrostatically applied on the test sheets so as to have a dried film thickness of 10 allowed to stand at room temperature for 3 minutes, and pre-dried at 80° C. for 5 minutes. Next, the clear paints (Z-1) to (Z-6) prepared in the manners described above were electrostatically applied so as to have a dried film with thickness of 35 allowed to stand at room temperature for 5 minutes, and heated in an oven at 85° C. for 20 minutes. Coated test sheets with a multilayer coating film formed thereon were thus obtained.

[Evaluation]

The multilayer coating films prepared as described above were subjected to coating film performance tests described below. The evaluation results are also shown in Table 1.

(Smoothness)

Finished appearance of each coated test sheet was evaluated in terms of smoothness. The smoothness was evaluated based on the following criteria using Wd-values measured by "Wave Scan DOI" (trade name, available from BYK-Gardner). The smaller the Wd value, the better the smoothness of the coated surface.

—Evaluation Criteria—
AA: Wd value is less than 5.0.
A: Wd value is 5.0 or more and 10.0 or less.
C: Wd value exceeds 10.0.

(Water Resistance Test: Blisters)

A partial portion of each coated test sheet was cut out from the sheet. Each portion was immersed in warm water at 40° C. for 10 days, then pulled up from the water and dried. The coated surface of each portion having been pulled up from the water was visually observed. Occurrence of blisters was evaluated according to the following criteria.

—Evaluation Criteria—
A: No blister occurred.
B: Some blisters occurred.
C: Blisters occurred on the overall surface.

(Water Resistance Test: Adhesion)

A partial portion of each coated test sheet was cut out from the sheet. Each portion was immersed in warm water at 40° C. for 10 days, then pulled up from the water and dried. The adhesion of each portion was evaluated as follows.

Cut lines were made on the surface of the coating film of each coated test sheet such that the cut lines reached the substrate to make 100 squares with a size of 2 mm×2 mm. Adhesive cellophane tape was adhered on the coating film surface and sharply peeled off at 20° C. The number of residual squares of the coating film was counted. The adhesion was evaluated according to the following criteria.

—Evaluation Criteria—
AA: 100 squares (no square peeled)
A: 100 squares (including squares partially peeled)
B: 51 squares or more and 99 squares or less
C: 50 squares or less (Recoat Adhesion)

The coated test sheets were allowed to stand at room temperature for 7 days. The same paints were repainted on the surface of each coated test sheet and cured. After allowing the recoated test sheets to stand at room temperature for 3 days, the recoated test sheets were subjected to an adhesion test in the same manner as the initial adhesion test described above. The number of residual squares of the coating film was counted. The adhesion was evaluated according to the following criteria.

—Evaluation Criteria—
AA: 100 squares (no square peeled)
A: 100 squares (including squares partially peeled)
B: 51 squares or more and 99 squares or less
C: 50 squares or less

TABLE 1

|  | Examples |  |  |  |  |  |  | Comparative examples |  |  |
|---|---|---|---|---|---|---|---|---|---|---|
|  | 1 | 2 | 3 | 4 | 5 | 6 | 7 | 1 | 2 | 3 |
| Test sheet | 1 | 2 | 1 | 1 | 1 | 2 | 1 | 1 | 1 | 1 |
| Aqueous 2-package type first colored paint type | X-1 | X-1 | X-2 | X-1 | X-1 | X-1 | X-3 | X-1 | X-1 | X-1 |
| Aqueous 1-package type second colored paint type | Y-1 | Y-1 | Y-1 | Y-1 | Y-1 | Y-1 | Y-1 | Y-1 | Y-1 | Y-1 |
| Clear paint type | Z-1 | Z-1 | Z-1 | Z-2 | Z-3 | Z-3 | Z-1 | Z-4 | Z-5 | Z-6 |
| Smoothness | AA | AA | AA | AA | AA | AA | AA | A | A | AA |
| Water resistance test: blisters | A | A | A | A | A | A | A | B | B | A |
| Water resistance test: adhesion | AA | AA | AA | AA | AA | AA | AA | B | A | AA |
| Recoat adhesion | AA | AA | AA | AA | AA | AA | A | AA | AA | B |

As shown in Table 1, it was found that the Examples produced by the method for forming a multilayer coating film of the present disclosure were excellent in smoothness, water resistance and recoat adhesion, Comparative example '1', in which the weight ratio of solid content of the polyisocyanate compound having a uretdione structure and the compound of a trimer or more of diisocyanate in the solvent-based 2-package type clear paint (Z) was 1/99, was inferior in the water resistance tests (blisters, adhesion).

Comparative example [2], in which the NCO/OH ratio was 1.2 in solvent-based 2-package type clear paint (Z), was inferior in the water resistance test (blisters).

Comparative example [3], in which the NCO/OH ratio was 2.2 in the solvent-based 2-package type clear paint (Z), was inferior in recoat adhesion.

The invention claimed is:

1. A method for forming a multilayer coating film, comprising:
a step (1) of applying an aqueous 2-package first colored paint on both a metal member and a plastic member of an automobile outer panel so as to form an uncured first colored coating film;
a step (2) of applying an aqueous 1-package second colored paint on the uncured first colored coating film obtained in step (1) so as to form an uncured second colored coating film;
a step (3) of applying a solvent-based 2-package clear paint on the uncured second colored coating film obtained in step (2) so as to form an uncured clear coating film; and
a step (4) of heating the uncured first colored coating film, the uncured second colored coating film and the uncured clear coating film formed in the steps (1) to (3) to 75 to 100° C. so as to simultaneously cure the coating films formed in the steps (1) to (3),
wherein the aqueous 2-package first colored paint contains a hydroxyl group-containing polyester resin, a hydroxyl group-containing acrylic resin, a hydroxyl group-containing polyurethane resin, and a polyisocyanate compound as film-forming components, and the polyisocyanate compound contains an anionic hydrophilized polyisocyanate compound, wherein the solvent-based 2-package clear paint contains a hydroxyl group-containing acrylic resin and a polyisocyanate compound in a ratio of 1.5 to 2.0 equivalents of isocyanate groups in the polyisocyanate compound relative to 1 equivalent of hydroxyl groups in the hydroxyl group-containing acrylic resin, and wherein the polyisocyanate compound contains a polyisocyanate compound having a uretdione structure and a compound of a trimer or more of diisocyanate in a weight ratio of solid content within a range of 10/90 to 50/50.

2. The method for forming a multilayer coating film according to claim 1, wherein the aqueous 2-package first colored paint contains a hydroxyl group-containing polyester resin, a hydroxyl group-containing acrylic resin, a hydroxyl group-containing polyurethane resin, and a polyisocyanate compound in a ratio of 1.5 to 2.0 equivalents of isocyanate groups in the polyisocyanate compound relative to 1 equivalent of hydroxyl groups in the hydroxyl group-containing polyester resin, the hydroxyl group-containing acrylic resin, and the hydroxyl group-containing polyurethane resin.

3. The method for forming a multilayer coating film according to claim 1,
wherein the aqueous 1-package second colored paint contains a hydroxyl group-containing polyester resin, a hydroxyl group-containing acrylic resin, a hydroxyl group-containing polyurethane resin, and a melamine resin, and
wherein water absorption of the second colored coating film is 6.5% or less at 20° C.

4. The method for forming a multilayer coating film according to claim 1, wherein the plastic member is coated with a primer in advance.

5. The method for forming a multilayer coating film according to claim 1, wherein the plastic member is made of a composite material of a polyamide resin and a modified polyphenylene ether resin.

6. The method for forming a multilayer coating film according to claim 1, wherein the solvent-based 2-package clear paint further contains polysiloxane modified silica particles having a mean primary particle diameter of 1 to 40 nm.

7. The method for forming a multilayer coating film according to claim 1, wherein the solvent-based 2-package clear paint further contains a coloring pigment.

* * * * *